Sept. 9, 1969      W. M. ALLEN      3,465,467
BAIT BOX
Filed May 12, 1967
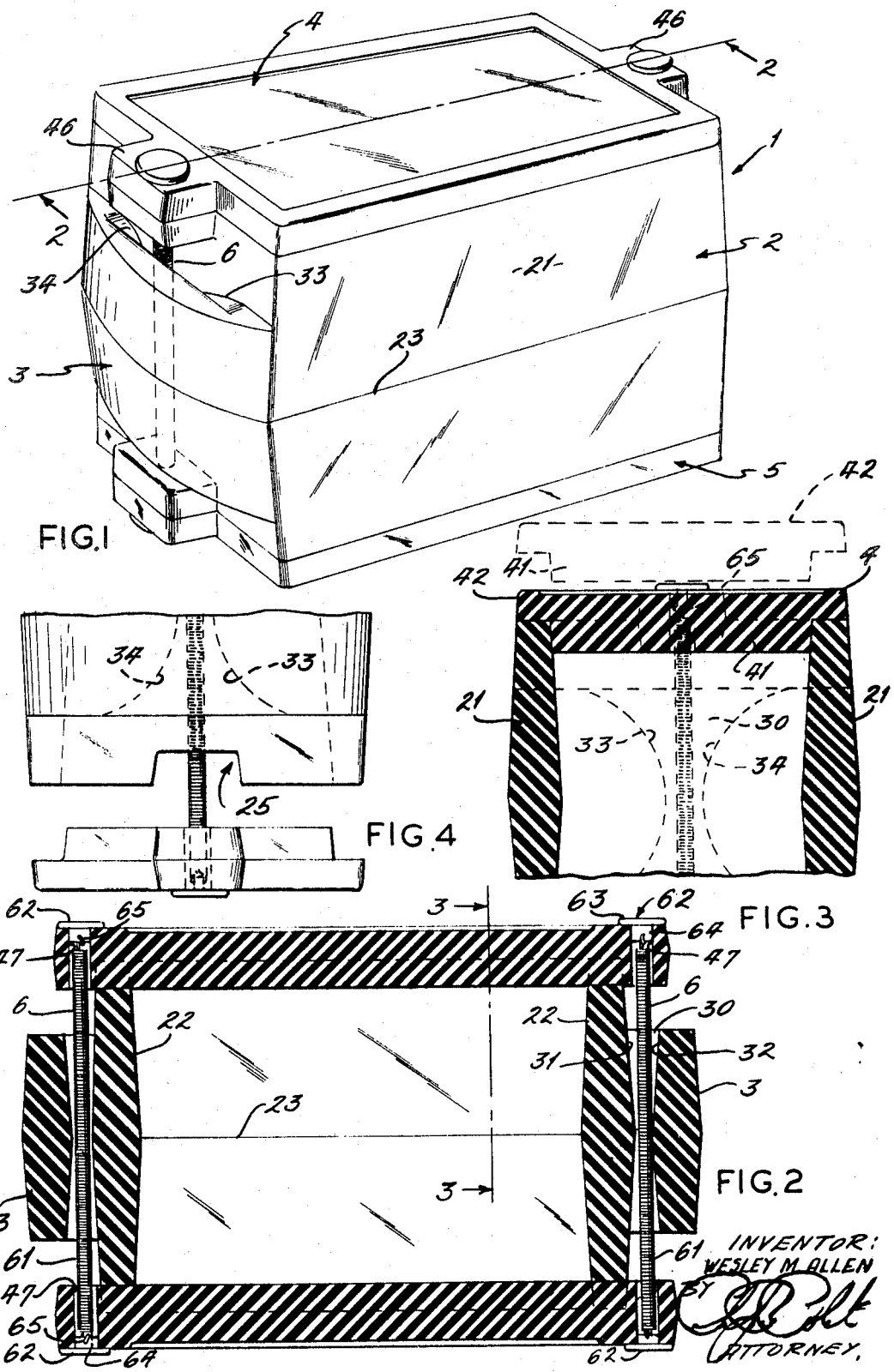

United States Patent Office 3,465,467
Patented Sept. 9, 1969

3,465,467
BAIT BOX
Wesley M. Allen, 218 County Line Road,
Windsor, Mo. 65360
Filed May 12, 1967, Ser. No. 642,635
Int. Cl. A01k *97/04*
U.S. Cl. 43—55         2 Claims

ABSTRACT OF THE DISCLOSURE

A container with side and end walls, molded in one piece, with lugs on the end walls terminating short of the bottom and top wall edges and with passages through them defined on the lateral sides by oppositely disposed arcuate walls diverging toward the top and bottom. The container is open top and bottom, and is selectively closed at top and bottom by closures having ears projecting at both ends. An elongated coil spring, loosely mounted in the passage in the lug at each end of the container, is connected at both ends of the spring to the ears of both closures, by means of a button on each closure. The container and closure are made of foamed plastic.

BACKGROUND OF THE INVENTION

In an ordinary bait box, worms burrow down to the bottom and have to be dug down for. Furthermore, ordinary bait boxes are heavy.

One of the objects of this invention is to provide a bait box in which access can be had to worms at either top or bottom.

Another object is to provide such a bait box which is light enough to float.

Still another object is to provide such a bait box which has closures so mounted as to remain snugly in closed position, but to be readily moved to and held in open position while still connected to the box.

Other objects will become apparent to those skilled in the art in the light of the following description and accompanying drawing.

SUMMARY OF THE INVENTION

In accordance with this invention, generally stated, a bait box is provided which has a container with openings top and bottom, and closures mounted on the container, each adapted selectively to be positioned to close one of the top and bottom openings and to be displaced to expose those openings, and means for retaining the closures in both opening closing and opening exposing positions.

In the preferred embodiment, the container and closures are molded of foamed plastic. The closures are provided with stepped panels, and ears projecting oppositely. The ears seat in notches in the free edges of the container. The container has lugs molded on end walls of the container, and provided with passages defined laterally by arcuate walls diverging toward top and bottom. Coil springs, mounted in and passing through the passages, have their opposite ends connected to the ears of the closures, preferably by means of buttons bearing on the outer surfaces of the ears.

BRIEF DESCRIPTION OF THE DRAWING

In the drawing, FIGURE 1 is a view in perspective of one embodiment of bait box of this invention;

FIGURE 2 is a sectional view taken along the line 2—2 of FIGURE 1;

FIGURE 3 is a sectional view taken along the line 3—3 of FIGURE 2; and

FIGURE 4 is a fragmentary view in end elevation of the bait box shown in FIGURE 1, in a position between bottom opening closing and bottom opening exposing position.

DESCRIPTION OF THE PREFERRED EMBODIMENT

Referring now to the drawing for one illustrative embodiment of bait box of this invention, reference numeral 1 indicates such bait box, which includes a molded one piece hollow container 2, lugs 3, integral with the container 2, a top closure 4, a bottom closure 5, and retainers 6.

The container 2 includes side walls 21 and end walls 22. Both side and end walls taper from a parting line 23 toward their free edges, to facilitate their molding. Each of the end walls 22 has in the center of its top and bottom edges, a notch 25.

The lugs 3 have a passage 30 defined by inner and outer walls 31 and 32 and side walls 33 and 34. The side walls 33 and 34 are arcuate, and diverge toward the top and bottom.

The top and bottom of the container 2 are open, and are defined by the upper and lower edges respectively of the side walls 21 and the end walls 22. The open top of the container is selectively closed by the top closure 4; the bottom, by the bottom closure 5.

The top closure 4 and bottom closure 5, in the embodiment shown, are identical. Since they are symmetrical, they are also mirror images, and, as mounted as shown in FIGURE 1, they are in mirror image relation.

Each of the closures has a central panel part 41, a stepped outer part 42, which provides an overhang around the entire closure, and a pair of oppositely extending ears 46 each with a hole 47 extending heightwise through it. The center part 41 fits easily within the opening defined by the walls 21 and 22. The overhang of the outer part 42 is about coextensive with the width of the top edges of the walls. The width and position of the ears 46 are such as to permit them to fit easily within the notch 25 in the edges of the end walls 22.

The draft on the ears, inner part 41 and notch 25, are all complementary to their corresponding seating elements, and are also primarily provided for ease in molding.

The retainers 6 include coil springs 61 with a hook 65 on each end, and buttons 62. Each of the buttons 62 has a head 63 and a stem 64. The stem 64 seats in the hole 47 in the ears 46. The stem 64 has a hole diametrically through it which receives the hook 65 on one end of a coil spring 61.

The method of manufacture of the container and closures will be apparent to those skilled in the art. A simple two part mold can be used, all of the vertical surfaces of both elements having a draft which permits their ready release from the two parts of the mold. In the illustrative embodiment shown, the container and closures are molded of foamed polystyrene, beads of the raw material being put into the mold, and heated to cause them to puff up and adhere to one another. The thick section of the ears 46, permitted by the notches 25, gives ample strength to the ears. The heads 63 of the buttons 62 distribute the force of the spring over a relatively wide area of the surface of the ears.

In assembling the bait box 1, each spring 61 can be hooked into one bead, and fed through a hole 47 in the ear of one closure. The spring is then pushed through the passage 30 in the lug 3 at each end, stretched manully intermediate its ends to permit the free end to be pushed through the hole 47 in the ear of the other closure to be mounted. The hook 65 on the free end of the spring is hooked through the hole in the stem of a button, and when both springs have been so mounted, the assembly of the box is complete.

The location of the lugs 3, terminating as they do well below the level of the edges of the end walls, permits either closure to be pulled against the bias of the springs to the position shown in FIGURES 3 and 4, and then to be moved around a contiguous long edge of the container, with the springs tending around walls 33 or 34 as the case may be, and to be moved along the side of the box until the spring tends intermediate the top and bottom edges of the side wall 21, in which position the closure will remain tight against the side wall, exposing the opening normally closed by that closure. Both closures can be moved to open position if it is desired, though there is normally no reason to do so.

In use, one of the closures is moved to its opened position, and the container is filled to a level below the notch 25 with a worm-supporting medium, preferably commercial worm bedding. The worms are put on top of the bedding, and then the closure can be returned to its closing position, as shown in FIGURES 1, 2 and 3. Worms have the tendency to burrow to the bottom of the container in which they are. Accordingly, when the time comes for using the worms for bait, the box is merely inverted, and the other closure, now on top, is moved to the opening exposing position, and the worms are immediately available, without the necessity of digging around in the bedding.

Numerous variations in the construction of the bait box of this invention, within the scope of the appended claims, will be apparent to those skilled in the art in the light of the foregoing disclosure. Merely by way of example, the box can be made of other materials, either other foamed plastics, such as polyurethane, which, like the polystyrene has the advantage of making a buoyant box, or other plastics or other materials. The retainers 6 can take the form of elastic cords or other resilient means. They can be made separately for each cover, making four in all. However, the coil spring of the preferred embodiment, extending from one closure to the other, has the advantage of strength and endurance, and also, the long span of the spring facilitates the movement of the closure from closed to open position with less chance for stretching the spring beyond its elastic limit in the process than if the spring were only half as long. The box can be given any desired shape or proportion. The outside bridging wall of the lugs can be omitted, leaving the arcuate walls 33 and 34 exposed, or a smaller lug or boss, without the arcuate walls can be used. However, in the latter case, unless separate springs or elastic members are used, there is the danger that if the upper closure is moved to the side of the box, the tension on the retaining spring will slack off to the point that the bottom closure may not be held snugly against displacement. This maintenance of the desired tension is one of the functions of the arcuate walls 33 and 34, another being to provide a smooth curved surface to support the spring against crimping. These variations are merely illustrative.

Having thus described the invention, what is claimed and desired to be secured by Letters Patent is:

1. A bait box comprising a container molded of foamed plastic, said container having side and end walls and being open top and bottom, said end walls having notches in their top and bottom free edges, lugs molded integrally with the end walls with passages through said lugs, said lugs terminating a substantial distance short of the top and bottom of the container and said passages being defined laterally of the end walls by opposed arcuate walls diverging toward the top and bottom; top and bottom closures molded of foamed plastic, each closure having a stepped closure panel with a part fitting inside the container opening and a flange overhanging the opening-defining edge of the side and end walls, and an ear projecting from each end of the closure and beyond the outer edge of the end walls of the container and seating in the notches in the end walls, and a coil spring at each end of the container, said coil spring extending through the passage in the lug and through holes in the ears of the closures and being fastened at each end of the opening to a button bearing on the top surface of the ear of the closure at that end.

2. A bait box comprising a container molded of foamed plastic, said container having side and end walls and being open top and bottom, lugs molded integrally with the end walls on the outside thereof, inner, outer and side walls within said lugs, defining a passage through each of said lugs in the direction between the said top and bottom, each of said passages being defined laterally of the end walls by said side walls, said side walls being opposed, arcuate, and diverging toward the top and bottom and said lugs terminating a substantial distance short of the top and bottom of the container; top and bottom closures molded of foamed plastic, each closure having locating means integral with it and a part of said closure projecting from each end of the closure beyond the outer contiguous edge of the end walls of the container and over the said lug passages, and an elastically elongatable member at each end of said container extending through the passage and made fast only at its two ends, said ends being connected to the projecting part of said top and bottom closures.

References Cited
UNITED STATES PATENTS

| | | | |
|---|---|---|---|
| 2,573,548 | 10/1951 | Cunningham | 220—38.5 X |
| 2,899,103 | 8/1959 | Ebert | 43—55 X |
| 2,903,814 | 9/1959 | Greer | 43—55 |
| 3,155,264 | 11/1964 | Shook | 206—1 X |

HUGH R. CHAMBLEE, Primary Examiner

U.S. Cl. X.R.

220—38.5